No. 608,619. Patented Aug. 9, 1898.
A. McKNIGHT.
INVALID BED.
(Application filed Oct. 8, 1896.)
(No Model.) 6 Sheets—Sheet 1.

WITNESSES:
Geo. W. Miller
Edwin Segur

INVENTOR
Alexander McKnight
BY
Witter & Kenyon
ATTORNEYS

No. 608,619. Patented Aug. 9, 1898.
A. McKNIGHT.
INVALID BED.
(Application filed Oct. 8, 1896.)
(No Model.) 6 Sheets—Sheet 2.

WITNESSES:

INVENTOR
Alexander McKnight
BY
Witter & Kenyon
ATTORNEYS

No. 608,619. Patented Aug. 9, 1898.
A. McKNIGHT.
INVALID BED.
(Application filed Oct. 8, 1896.)
(No Model.) 6 Sheets—Sheet 3.

WITNESSES: INVENTOR
Alexander McKnight
BY
ATTORNEYS

No. 608,619. Patented Aug. 9, 1898.
A. McKNIGHT.
INVALID BED.
(Application filed Oct. 8, 1896.)
(No Model.) 6 Sheets—Sheet 4.

WITNESSES:

INVENTOR
Alexander McKnight
BY
ATTORNEYS

No. 608,619. Patented Aug. 9, 1898.
A. McKNIGHT.
INVALID BED.
(Application filed Oct. 8, 1896.)
(No Model.) 6 Sheets—Sheet 5.

WITNESSES:
INVENTOR
Alexander McKnight
BY
Witter & Kenyon
ATTORNEYS

No. 608,619. Patented Aug. 9, 1898.
A. McKNIGHT.
INVALID BED.
(Application filed Oct. 8, 1896.)
(No Model.) 6 Sheets—Sheet 6.

WITNESSES:

INVENTOR
Alexander McKnight
BY
Witter & Kenyon
ATTORNEYS

UNITED STATES PATENT OFFICE.

ALEXANDER McKNIGHT, OF NEW YORK, N. Y.

INVALID-BED.

SPECIFICATION forming part of Letters Patent No. 608,619, dated August 9, 1898.

Application filed October 8, 1896. Serial No. 608,217. (No model.)

*To all whom it may concern:*

Be it known that I, ALEXANDER MCKNIGHT, a citizen of the United States, residing in the city of New York, (Brooklyn,) county of Kings, and State of New York, have invented an Invalid-Bed, of which the following is a specification.

This invention relates to invalid-beds, and has for its object to provide a bed of this character improved and simplified in its construction, whereby an invalid may be handled with greater facility and less annoyance to the patient than has been heretofore attained and whereby the cost of such a bed is brought within very reasonable limits.

The invention consists of the construction and the various features hereinafter set forth.

Referring now to the drawings forming part of this specification and embodying the invention and in which like letters of reference designate corresponding parts throughout, Fig. 12$^a$ is a perspective view of a wire ring employed on the side rails of the hammock to make the connection with its bottom fabric. Fig. 13 is a side elevation showing the hammock in elevated position.

In the several elevations and plan views of the bed I have omitted in some of these figures the illustration of various features shown in other figures for the sake of clearness and to avoid duplication of parts.

The frame of the bed comprises the usual end rails A A' and side rails B B', which are supported by legs extended above the rails to form posts $A^2 A^2$ and $B^2 B^2$ at the head and foot, respectively. The bed-bottom is made in three separate sections—the head-section C, middle section D, and leg-section E. The head-section has side rails $a\ a'$ and end rails $b\ b'$. The end rail $b'$ is depressed along its length to prevent the bottom fabric when under strain from striking it. The inner end of the head-section is pivotally supported by trunnions $c\ c'$, resting in bearings $d\ d'$ on the side rails B B' of the bed-frame. These trunnions stand in a line above the level of the head-section when it is in horizontal position, so that the head-section when moving from horizontal to upright position swings to a slight degree bodily toward the head of the bed. The object of this arrangement is to provide ample room for the mattress to fold at the inner end of the head-section when the head-section is raised, so that the patient will not be crowded forward. This is an important feature and adds greatly to the comfort of the patient when the head-section is raised or lowered.

Figure 1:
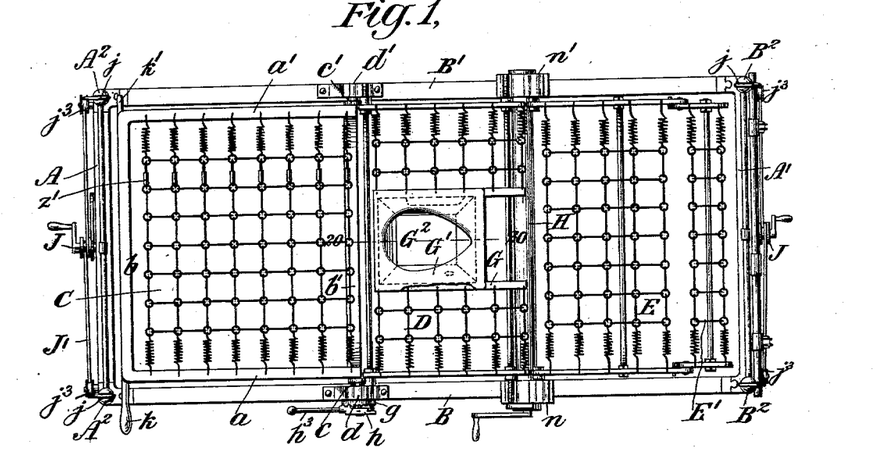
Figure 1 is a plan view of the bed, showing the bed-bottom.
Figure 2:
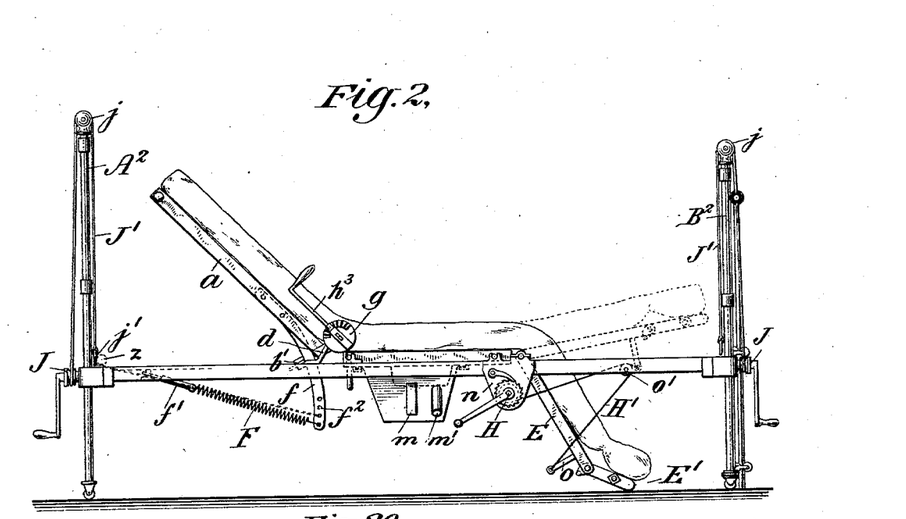
Fig. 2 is a side elevation showing the bed-bottom and mattress in position for a sitting posture.
Figure 15:
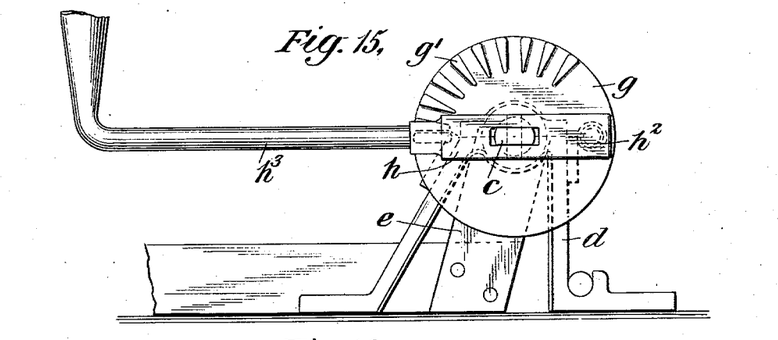
Figs. 15 and 16 are respectively a side elevation and plan view of a clutch for the head-section of the bed-bottom.
Figure 16:
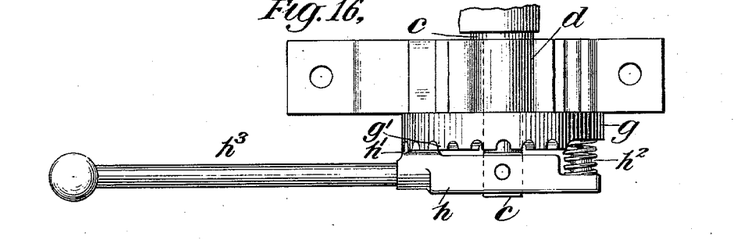
Figures 17, 18:
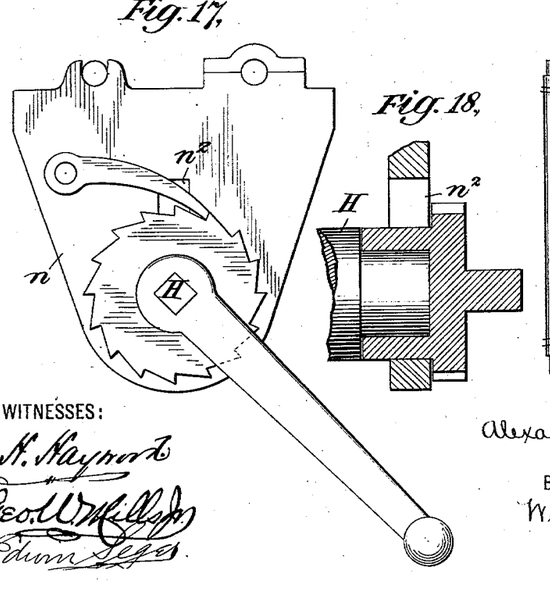
Fig. 17 is a side elevation of a crank and windlass for the foot-section of the bed-bottom.
Fig. 18 is a sectional elevation of one end of the windlass.
Figure 19:
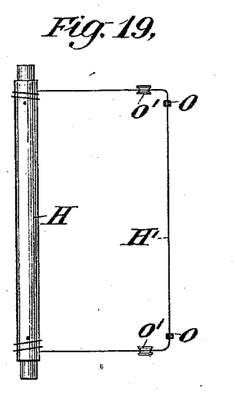
Fig. 19 is a diagram of this windlass and its cord.
Figure 20:
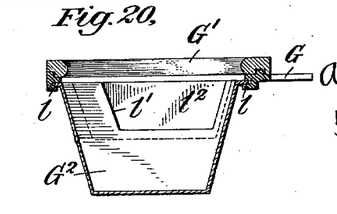
Fig. 20 is a side elevation of the bed-pan on the line 20, Fig. 1.

In Figs. 2 and 15 I have shown the trunnions $c\ c'$ projecting from short arms $e$, extending from the side rails, as embodying this arrangement. The head-section is generally counterbalanced by means of springs, so as to have a tendency to rise of itself. These springs F are secured at their outer ends to the bed-frame and at their other ends to arms $f$, downwardly extending from the head-section. To provide for adjustability of the springs, they are provided with turnbuckles $f'$, or the arms $f$ are provided with a plurality of apertures, into which the springs may hook. A suitable locking device is provided in order to lock the head-section in any desired position, and in the best form is so arranged as to be capable of easy operation by the occupant of the bed. This locking device, in conjunction with the counterbalance of the head-section, enables the patient himself to raise and lower the head-section with practically no effort on his part and without the aid of an attendant. The locking device in its best form consists of two meshing members, one of which is stationary and the other of which is carried by the head-section, so as to be accessible to the patient in any position.

In the present embodiment of the invention $g$ is a stationary plate having a circular rack $g'$ and fixed to the bearing $d$, Fig. 15. $h$ is a latch pivoted in the end of the trunnion $c$. This latch has a tooth $h'$ on one end, adapted to take in the rack, and has a spring $h^2$ at its other end, bearing on the plate $g$, which serves to urge the tooth $h'$ into mesh with the rack. $h^3$ is an operating handle or rod secured to the latch and extending up alongside the head-section. When this rod is pushed outward, the latch is disengaged from the rack, the counterbalance-spring F raises the head-section automatically, and the rod and latch are carried up with the head-section by the trunnion $c$, the spring $h^2$ moving over the face of the rack-plate. When the rod is released, the spring $h^2$ urges the latch into engagement with the rack to lock the head-section. The outer end of the head-section is generally provided with projections $k$ $k'$, adapted to rest on the rails B B' to provide rigid supports for the head-section when in horizontal position. One of these, $k$, may be used as a handle to assist the springs in raising the head-section, if occasion requires. The rod $h^3$ may be also used to raise the head-section. The springs F, however, are ordinarily expected to do this work and are arranged for adjustment to suit the weight of the patient. The latch $h$ has a certain small amount of play in the rack $g$, which enables the head-section when raised to rock slightly on its pivots against the springs F. The weight of the patient's back, therefore, is largely supported by these springs when the head-section is raised, and the patient's comfort is thereby largely added to.

The middle section D of the bed-bottom is removably supported on the side rails B B'. Supported by the bottom fabric of this section and forming part thereof is a commode-seat. The seat comprises a commode-frame G, connected on both sides with the fabric, and a seat-frame G', removably supported by and fitting over a tongue on top of the commode-frame. The under side of the commode-frame G is provided with flanges $l$, which support a removable commode G², cut away on its inner side at $l'$ in order that when the pan is removed while the patient is occupying the seat the pan will clear any part of the patient's body projecting below the seat. A piece $l^2$ extends downward from the frame G to cover this cut-away portion $l'$ when the commode is in position, so as to protect the patient from drafts while occupying the seat. The commode is provided with a handle $m$ and also with an overflow-pipe $m'$, sometimes especially serviceable when large douches are taken by the patient.

The leg-section is pivoted at its inner end to the side rails B B' and is provided with a foot-section E', adapted to fold upward. The leg-section is operated by a windlass H, extending underneath the bed-frame and supported in bearing-brackets $n$ $n'$, secured to the side rails B B'. The windlass is provided with the usual pawl and ratchet and crank. The cord or cords of the windlass are connected with the leg-section for operating it. In the best form I employ a continuous lifting-cord K', having its ends secured to the windlass near the ends thereof and engaging arms $o$, projecting downward from the side rails of the leg-section and passing over pulleys $o'$ on the side rails B B'. The main portion of the leg-section is of such length as just to clear the floor when lowered, so that a patient may sit perfectly upright, with his lower legs in vertical position, the foot-section at such time striking the floor and folding to the proper extent. The joint of the foot-section is so arranged as to prevent the foot-section from turning down below the plain of the main portion of the leg-section. By employing the arms $o$ the leg-section may be raised above the level of the bed-frame, as shown in dotted lines in Fig. 2. The windlass K may be removed, together with its cord, from its bracket $n$ by drawing it out on one side of the bed-frame, the cord passing through the slot or notch $n^2$ in the bracket $n$. The bed-bottom fabric employed for the sections of the bed-bottom in the best form of the invention consists of a suitable fabric secured only to the side rails of the bed-bottom and has transversely-yielding springs. This form is shown in the drawings. It is separately described and claimed in my Patent No. 565,018, granted to me August 6, 1896, and need not be here particularly described. It has in this invention a peculiar utility over other forms of bed-bottom fabric because it dispenses with supporting end rails for the several sections of bed-bottom and enables the short sections of fabric to yield throughout their entire length. If these short sections of fabric had to be supported at their ends by arms or cross-rails, the comfort especially desirable in an invalid-bed would be largely sacrificed, because not only would the separate sections be less yielding and easy, but the patient would have to rest on four of these rails at the middle of the bed. However, my invention is not, of course, limited to the employment of any particular form of bottom fabric, and many of its features are quite independent in their function of any particular bottom fabric.

The bed is provided with a hammock or stretcher and hoisting mechanism to lift the patient up from the bed, so that the bedding may be aired or changed. At the ends of the bed and generally secured to the end rails A A' are windlasses J, whose cords J' pass around guide-pulleys $j^3$ near the corners of the bed and up over supports $j$, preferably in the form of small sheaves on the posts $A^2$ and $B^2$, and are provided with rings $j'$ or other suitable means for attachment to the hammock.

Figure 12:
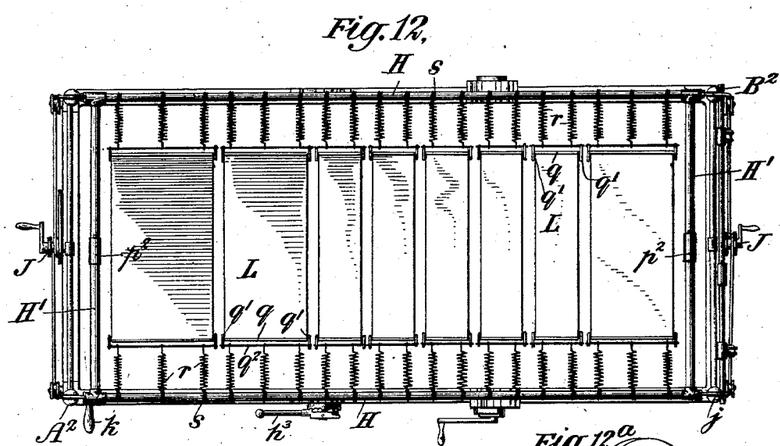
Fig. 12 is a plan view showing the hammock in place.
Figures 12A, 13:
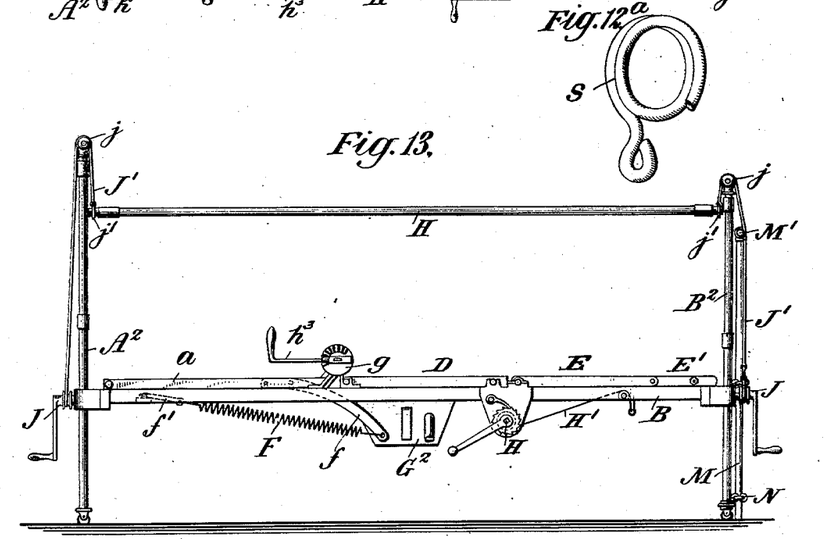
Figure 14:
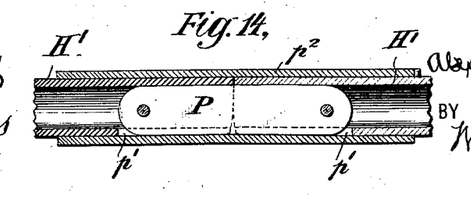
Fig. 14 is a side elevation in section, showing a folding joint for the end rails of the hammock-frame.

In the best form of the invention I employ a windlass having a single continuous cord adjustably connected with the windlass to take up automatically any slack in either end of the cord. In carrying out this purpose an aperture $j^2$ is made in the windlass, through which the cord freely passes. The windlass is provided with the usual pawl and ratchet and crank, and when the cord is wound up any slack in either end immediately divides itself between the two ends and disappears, the cord slipping through the aperture of the windlass until such distribution takes place before being wound on the windlass. This is an important feature, as it prevents the possibility of one side or corner of the hammock tilting and maintains the hammock in a horizontal plane. When the hammock is to be hoisted, both windlasses are operated simultaneously. The hammock or stretcher itself may vary in form; but I have devised a special form which I deem best and which has many important advantages. It is shown in Fig. 12 and is practically a bed-bottom. It comprises a frame formed of side rails H and jointed end rails H', whereby this bed-bottom or hammock is adapted to fold. These rails are preferably tubes. The joints of the end rails are one-way break-joints. They break upward from the horizontal only. In making these joints I pivot a link $p$ at both its ends in the adjoining ends of the two sections composing an end rail and cut away at $p'$ those ends of the rail-sections beneath the link. A sleeve $p^2$, sliding on the rail, when moved to cover the joint holds the joint rigid and when moved to one side leaves the joint free to bend. The bottom fabric which I prefer to use for this hammock or bed-bottom is of the character described and claimed in my above-mentioned patent—that is, it is supported only by the side rails and has transversely-yielding springs. In the particular form here shown the fabric is made up of a plurality of separate and independent strips or bands L, generally of canvas. Stitched in the ends of these bands are small rods $q$, which are connected by means of links $q'$ with rods $q^2$ a little beyond the ends of the strips, and reaching from these rods $q^2$ to the side rails H are springs $r$, detachably connected with these rails. I preferably employ wire rings $s$ on these rails H, to which the springs $r$ are hooked. This obviates the necessity of boring holes in the side rails, which would tend to weaken the rails and offer homes for vermin. When the patient is to be lifted up on the hammock, the head-section is first raised and several of strips L slipped in place behind him. The head-section is then lowered and the rest of the strips slipped under his legs and body. The hammock-frame is then put upon the bed and the end rails H' bent upward at their joints. The strips are then hooked to the rings $s$ and the end rails H' are pressed down and the joints locked, thereby stretching the strips L beneath the patient. The lifting-cords J' are then attached to the corners of the hammock-frame and the windlasses are operated to lift and hold the patient above the bed. If it is desired, as is sometimes the case, to keep the patient resting at an inclination, this is easily effected by raising one end of the hammock higher than the other by means of the windlass at one end. The manner of lowering the hammock, restoring the patient to the bed, and removing the hammock will be apparent.

In some cases it is very important to keep a patient resting at an inclination in the bed, and for this purpose I have provided simple and convenient means whereby one end of the bed may be hoisted and held at any desired height. In carrying out this purpose I employ a pair of hoisting-legs M M, supported in place by the bed-frame at one end, on which by suitable hoisting mechanism the bed-frame is bodily lifted and supported at one end. The most convenient hoisting mechanism is the windlass J and its cord J'. The cord J' only requires suitable means for connecting it to the legs M. In the best form I provide the cord with rings $t$ $t$, adapted to slip over the ends of the cross-bar M', connecting the upper ends of the legs. This cross-bar generally has sockets $t'$ to receive the ends of the legs M in order that it may be separable from the legs for convenience in storing. As means for supporting the legs M in place I have shown brackets N, secured on and projecting from the end rail A', and a bar O, connecting the posts $B^2$. These brackets, of which, as shown, there are two for each leg M, are preferably provided with two antifriction-rollers $u$, between which a leg M passes. To hoist one end of the bed, it is only necessary to attach the rings $t$ $t$ to the rod M' and turn the windlass J, which can be done by an attendant with little effort. It sometimes becomes desirable to operate upon a patient without removing him from his bed; but beds are generally too low for the convenience of the surgeon and his attendants. I overcome this difficulty by employing a pair of hoisting-legs M M for each end of the bed, so that the bed can be elevated to any height desired by operating the windlasses J and may be kept at an inclination at the same time, if required. In some cases it is necessary to put the patient's leg or legs under longitudinal strain. For this purpose I provide an ordinary stretching-cord P and weight P'. This cord where it passes over the foot of the bed has a support which is adjustable vertically and laterally, whereby whatever be the elevation of the patient on the bed or on whatever side of the bed the leg to be stretched is resting the cord P may be so adjusted as to exert a longitudinal strain in any plane. In the present embodiment of this part of the invention I employ a support, preferably a pulley R, depending from the rod M' and movable thereon. From this pulley R is swung, by means of a cord or chain $v$, a support, preferably a pulley $R^2$, over which the cord P runs. The pulley $R^2$ may be vertically adjusted by means of the chain $v$. It thus appears that the support or pulley $R^2$ is both vertically and laterally adjustable.

Figure 3:
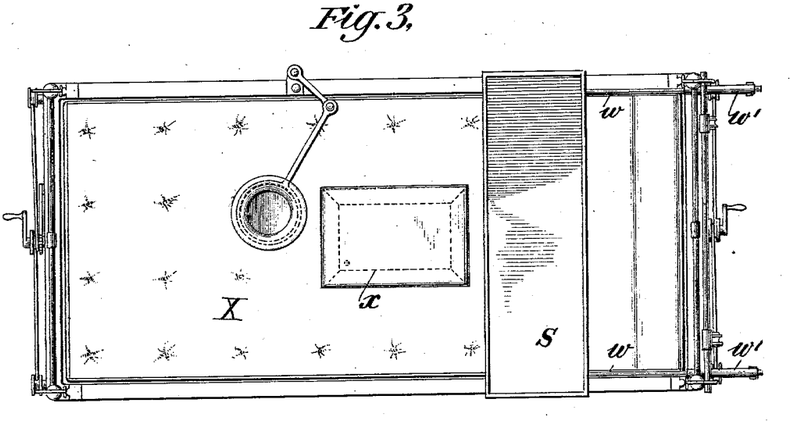
Fig. 3 is a plan view showing the mattress and table attachment.
Figure 4:
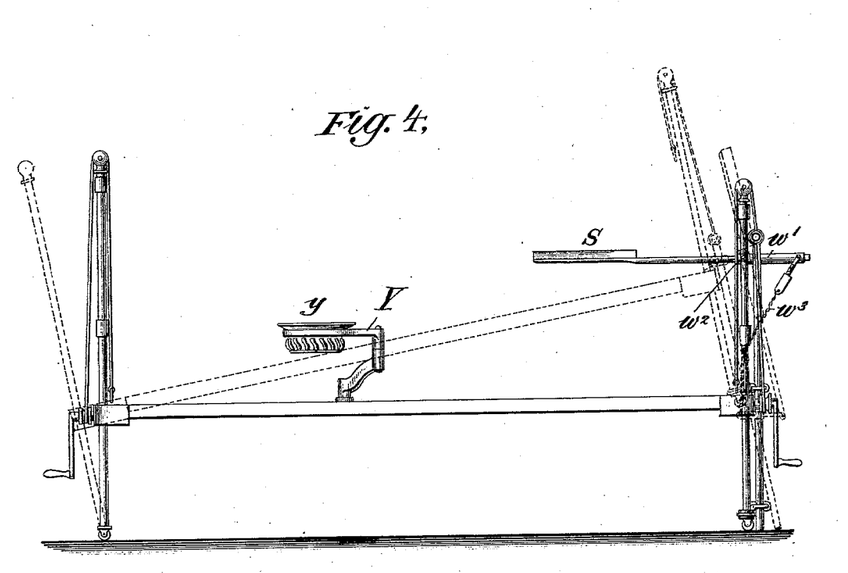
Fig. 4 is a side elevation showing the table attachment and showing in dotted lines the bed tilted up at one end.
Figure 5:
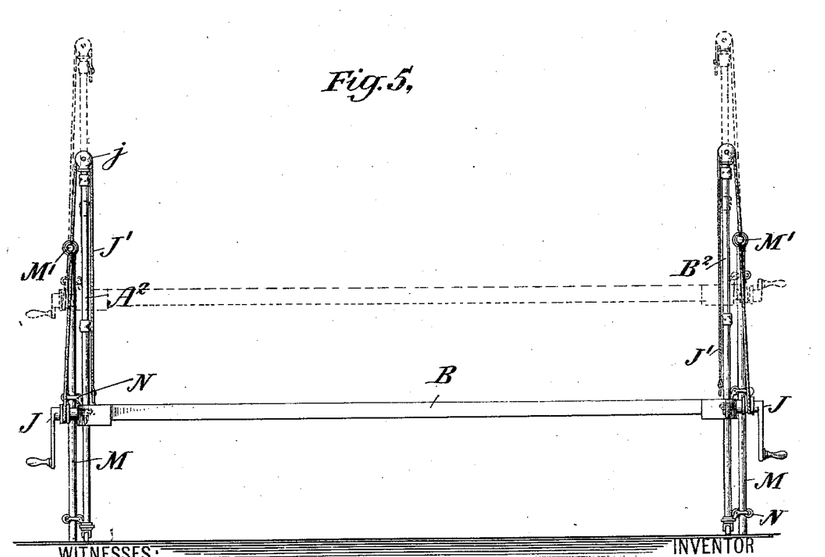
Fig. 5 is a side elevation showing in dotted lines the bed elevated.
Figure 6:
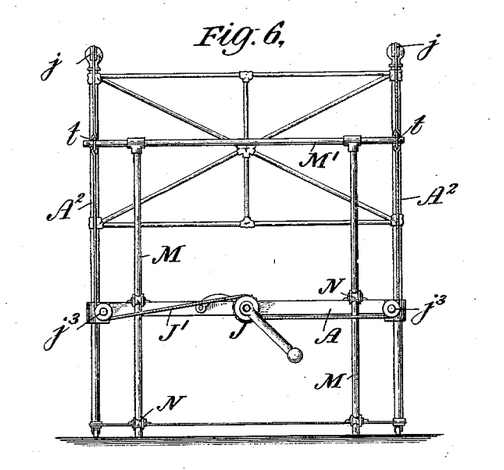
Fig. 6 is an end elevation of the head of the bed.
Figure 7:
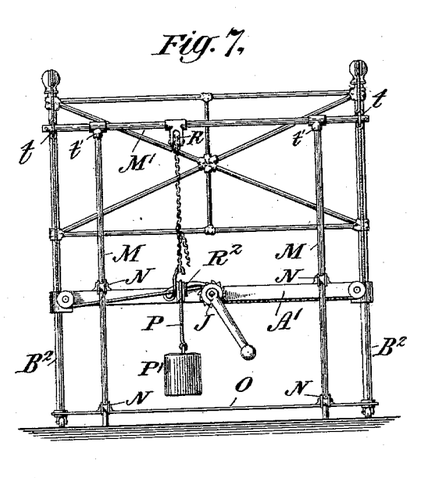
Fig. 7 is an end elevation of the foot of the bed.
Figure 8:
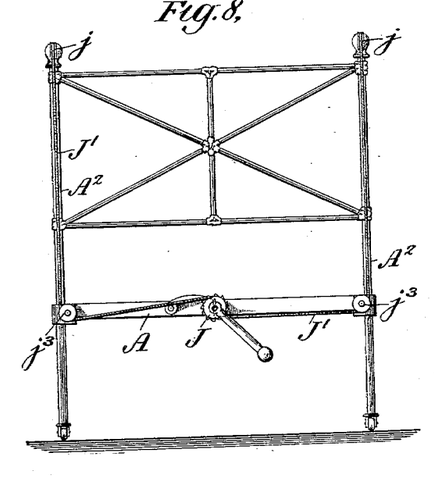
Fig. 8 is an end elevation of the head of the bed without the hoisting-legs.
Figures 9, 10:
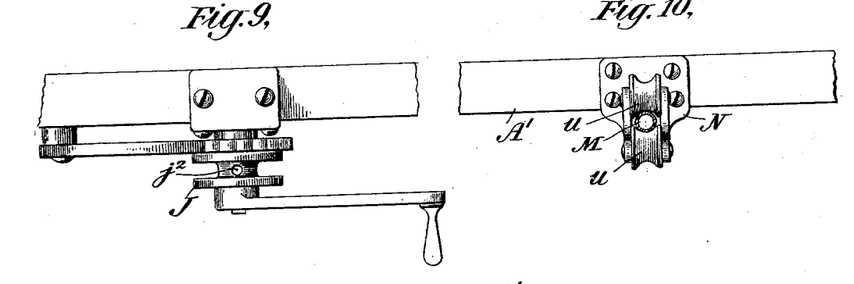
Fig. 9 is a plan view of a windlass employed at each end of the bed.
Fig. 10 is a plan view of an antifriction-socket secured to the ends of the bed for the hoisting-legs.
Figure 11:
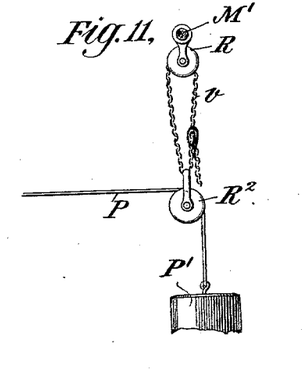
Fig. 11 is a side elevation of a leg-stretcher.

The bed is provided with a vertically and horizontally adjustable folding table, as shown in Figs. 3 and 4. As therein shown, the table is supported by the foot of the bed-frame, although, of course, it might in some cases be supported at the head. S is the table-top, carried by two arms $w$ $w$, supported by the posts $B^2 B^2$, and arranged to slide back and forth on supports pivoted to these posts. These supports are preferably in the form of tubular sockets $w'$ $w'$ and are pivoted to the posts at $w^2$. When the table is in use, the sockets $w'$ are turned up and the top S is pulled out to the required distance. When the table is not in use, it may be pushed back, its arms sliding in the sockets $w'$, and the table may be then folded up into a substantially vertical position against the foot of the bed, the sockets $w'$ turning down on their pivots.

Chains or cords $w^3$, connected to the sockets $w'$ and adapted for connection with the bed-frame, are generally employed, so as to hold the table-top when in use at the proper height. By varying the length of the chain $w^3$ the height of the table-top may be adjusted to suit the convenience of the patient. It will thus be seen that the table is vertically and horizontally adjustable.

Y is a jointed swinging bracket fixed to the side rail of the bed-frame and carrying a cuspidor $y$. The mattress X is provided with an opening over the commode-seat extending through the mattress and made larger at the top than at the bottom by having its sides slanting inward, as shown in dotted lines, Fig. 3. This opening is normally closed by an inflatable cushion larger at its top than at its bottom, which fits snugly in place and flush with the top surface of the mattress. It is to be filled with air or water, and is located in that part of the mattress which supports the hips of the patient. Bed-sores generally form first in the region of the patient's hips and near the base of the spine, but by the employment of the inflatable cushion $x$ the formation of these bed-sores is prevented or at least greatly retarded. Cushions, such as $x$, may be fitted to the mattress at any place desired.

If it were desired to dispense with the springs F for lifting the head-section, the cord J' may have its ends passed around guide-pulleys on the corners of the bed-frame and connected with the arms $f$, as shown in dotted lines, Fig. 2. The windlass J may then be used to operate the head-section.

In some cases it may become desirable to take up any slack in the bed-bottom. I provide for this by suitable adjusting devices, such as the turnbuckles $f$. (Shown in Fig. 2.)

While I have shown in the drawings the best form of the complete invention and its various features now known to me, it will readily be seen by one skilled in the art that various changes may be made without departing from the scope and spirit of the invention. Many features of the invention are applicable to invalid-chairs.

What I claim as new, and desire to secure by Letters Patent, is—

1. In an invalid-bed the combination with the bed-frame, of a windlass supported by the bed and provided with a single continuous cord having its two ends adapted for engagement with the part to be shifted, the cord being loosely connected with the windlass so as to automatically adjust itself to its work, substantially as set forth.

2. In an invalid-bed, the combination with the bed-frame, of a windlass supported by the bed and provided with a single continuous cord having its two ends adapted for engagement with the part to be shifted, the cord passing freely through an eye in the windlass so as to automatically adjust itself to its work, substantially as set forth.

3. In an invalid-bed, the combination with the bed-frame and bed-bottom, of a hammock or stretcher comprising a folding frame having upwardly-breaking one-way joints and a bottom composed of a plurality of separate and independent strips or bands removably connected with the side rails of the frame, and means connected near the corners of the frame for hoisting the hammock above the bed-bottom, substantially as set forth.

4. A bed-bottom comprising a frame consisting of rigid side rails and jointed end rails, and a flexible spring-bottom removably connected with the side rails and consisting of springs connected to the side rails and of separate and independent strips or bands having their ends connected to said springs, substantially as set forth.

5. In an invalid-bed, the combination with a bed-frame, of hoisting-legs in addition to the legs of the bed-frame supported in position by the bed-frame, and hoisting mechanism connecting the said legs and bed-frame whereby the bed-frame may be lifted on said hoisting-legs, substantially as set forth.

6. In an invalid-bed, the combination with a bed-frame, of hoisting-legs in addition to the legs of the bed-frame supported in position by the bed-frame, and hoisting mechanism supported on the bed-frame connecting the said legs and bed-frame whereby the bed-frame may be lifted on said hoisting-legs, substantially as set forth.

7. In an invalid-bed, the combination with the bed-frame, of a pair of hoisting-legs for each end of the bed in addition to the legs of the bed-frame and supported in position by the bed-frame, and two independent hoisting mechanisms, one for each end of the bed, each of said hoisting mechanisms connecting a pair of hoisting-legs with the bed-frame whereby either end or both ends of the bed-frame may be lifted on said hoisting-legs, substantially as set forth.

8. In an invalid-bed, the combination with the bed-frame, of a pair of hoisting-legs in addition to the legs of the bed-frame and supported in position by the bed-frame at one end thereof, a windlass supported at the end of the bed, a cord or cords connecting with the windlass and having the free ends adapted for connection with the hoisting-legs above the bed-frame, said cord or cords passing around guide-pulleys or their equivalent fixed to the bed-frame one on each side of the windlass, substantially as set forth.

9. In an invalid-bed, the combination with the bed-frame, of a pivoted leg-section pivotally supported by the bed-frame and having downwardly-projecting arms, a windlass supported by the bed-frame having a cord or cords connecting with the said arms of the pivoted section, and supporting-guides on the bed-frame over which the cord or cords pass to the said arms from the windlass whereby the said leg-section may be elevated and inclined above the bed-frame, substantially as set forth.

10. In an invalid-bed, the combination with the bed-frame of a leg-section pivotally supported by the bed-frame and having at its outer end a folding foot-section, said leg-section adapted to be depressed below and elevated and inclined above the bed-frame and means for operating the leg-section, substantially as set forth.

11. In an invalid-bed, the combination with the bed-frame of an end section pivotally supported by the bed-frame, a windlass removably supported in bearing-brackets on the bed-frame and having a cord or cords secured thereto and removably connected with the end section, one of the windlass-brackets having a notch therein through which the cord may be withdrawn when the windlass is removed, substantially as set forth.

12. In an invalid-bed the combination with the bed-frame, of a leg-section pivotally supported by the bed-frame and having downwardly-projecting arms, a windlass supported by the bed-frame, a single continuous cord having its ends secured to the windlass and engaging the said arms of the end section to adjust the same, and supporting-guides on the bed-frame over which the cord passes from the windlass to the end section, substantially as set forth.

13. In an invalid-bed, the combination with the bed-frame having posts, of a table having arms, and supports for said arms pivoted to the posts, the table-arms adjustable in the supports substantially as set forth.

14. In an invalid-bed, the combination with the bed-frame having posts, of a table having arms, tubular supports in which said arms are adjustably supported, said tubular supports being pivoted to the bed-posts, and means for holding the tubular supports in place, substantially as set forth.

15. In an invalid-bed, the combination with the bed-frame having posts at the foot, of a table supported by the posts and horizontally and vertically adjustable and adapted to fold up against the said posts, substantially as set forth.

16. In an invalid-bed, the combination with the bed-bottom comprising side rails, depressed end rails and a bottom fabric secured to the side rails only and having transversely-yielding springs, of a commode-frame supported by the bed-bottom fabric, said commode-seat comprising a supporting commode-frame connected with the bottom fabric, and a seat-frame, substantially as set forth.

17. In an invalid-bed, the combination with the bottom fabric, of a removable commode-pan supported underneath an opening in said fabric, the commode-pan being cut away on one side, and a piece carried on the under side of the bottom fabric at said opening adapted to close the commode-pan at its cut-away portion when the pan is in place, substantially as and for the purpose set forth.

18. In an invalid-bed the combination with the bottom fabric, of a removable commode-pan supported underneath an opening in said fabric, the commode-pan being provided with an overflow-duct, substantially as and for the purpose set forth.

19. A mattress for a bed, having an opening all the way through the same larger at the top than at the bottom and an inflated cushion larger at the top than at the bottom, and fitting said opening and flush with the upper surface of the mattress, substantially as set forth.

20. In an invalid-bed, the combination of a bed-bottom consisting of a middle section and pivoted leg and head sections, a commode-frame carried by and forming part of the bottom of the middle section, a commode adapted to be removably supported by and underneath the commode-frame, a commode-seat supported on and carried by the commode-frame, a mattress covering the bed-bottom and seat-frame, and having a removable section directly over the seat-frame, whereby an occupant of the bed is enabled to sit in a natural upright position upon the seat-frame and beneath the level of the mattress when the said removable section of the mattress is removed, substantially as set forth.

In testimony whereof I have signed my name to this specification in the presence of two subscribing witnesses.

ALEXANDER McKNIGHT.

Witnesses:
 EDWIN SEGER,
 NICHOLAS M. GOODLETT, Jr.